US009086476B1

(12) United States Patent
Schuss et al.

(10) Patent No.: US 9,086,476 B1
(45) Date of Patent: Jul. 21, 2015

(54) METHOD AND APPARATUS FOR REJECTING INTERMODULATION PRODUCTS

(71) Applicants: Jack J. Schuss, Newton, MA (US); Stephen M. Sparagna, Milton, MA (US)

(72) Inventors: Jack J. Schuss, Newton, MA (US); Stephen M. Sparagna, Milton, MA (US)

(73) Assignee: RAYTHEON COMPANY, Waltham, MA (US)

(*) Notice: Subject to any disclaimer, the term of this patent is extended or adjusted under 35 U.S.C. 154(b) by 251 days.

(21) Appl. No.: 13/662,641

(22) Filed: Oct. 29, 2012

Related U.S. Application Data

(63) Continuation of application No. 12/730,533, filed on Mar. 24, 2010, now abandoned.

(51) Int. Cl.
G01S 13/00 (2006.01)
G01S 13/04 (2006.01)

(52) U.S. Cl.
CPC ...................................... *G01S 13/04* (2013.01)

(58) Field of Classification Search
CPC ..................................................... G01S 13/04
USPC ................................................. 342/118–146
See application file for complete search history.

(56) References Cited

U.S. PATENT DOCUMENTS

| 3,021,521 | A | 2/1962 | Hutchins |
| 4,197,540 | A | 4/1980 | Riggs et al. |
| 4,216,472 | A | 8/1980 | Albanese |
| 4,970,519 | A | 11/1990 | Minnis et al. |
| 5,646,625 | A | 7/1997 | Burrier |
| 5,966,048 | A | 10/1999 | Thompson |
| 6,078,289 | A | 6/2000 | Manoogian et al. |
| 6,218,987 | B1 | 4/2001 | Derneryd et al. |
| 6,496,158 | B1 | 12/2002 | Ksienski et al. |
| 6,507,315 | B2 | 1/2003 | Purdy et al. |
| 6,799,014 | B2 | 9/2004 | Rosen et al. |
| 6,856,284 | B1 | 2/2005 | Cangiani |
| 6,933,878 | B1 | 8/2005 | Molyneux-Berry |
| 6,963,312 | B2 | 11/2005 | Schuneman et al. |
| 7,180,457 | B2 | 2/2007 | Trott et al. |
| 7,477,921 | B2 | 1/2009 | Shattil |
| 7,492,313 | B1 | 2/2009 | Ehret et al. |
| 7,538,564 | B2 | 5/2009 | Ehrmann et al. |
| 7,808,427 | B1 | 10/2010 | Sarcione et al. |

(Continued)

OTHER PUBLICATIONS

U.S. Appl. No. 12/730,533, filed Mar. 24, 2010, Schuss et al.

(Continued)

*Primary Examiner* — Timothy A Brainard
(74) *Attorney, Agent, or Firm* — Daly, Crowley, Mofford & Durkee, LLP

(57) ABSTRACT

Methods and apparatus for providing a radar system that rejects intermodulation products than can generate false targets. In one embodiment, a method includes transmitting a first signal at a first time at a first frequency to detect a target within a first altitude range, determining a range from a first receive time to a second receive time for possible signal return from the target within the first altitude range, receiving the possible signal return from the target in a frequency band of interest based upon the first frequency while transmitting a second signal at a second frequency spaced a selected frequency distance from the first frequency to place transmit feedthrough outside of the receive frequency band of interest and false target return outside the frequency band of interest for rejecting intermodulation products.

14 Claims, 19 Drawing Sheets

(56) References Cited

U.S. PATENT DOCUMENTS

2008/0204318 A1    8/2008    Thomas et al.
2008/0272959 A1   11/2008   Meharry et al.
2011/0187583 A1*  8/2011    Nouvel et al. ................ 342/129
2012/0319900 A1   12/2012   Johansson et al.

OTHER PUBLICATIONS

Notice of Allowance dated Apr. 18, 2012, U.S. Appl. No. 12/466,066, 10 pages.
Notice of Allowance dated Apr. 19, 2013, U.S. Appl. No. 12/635,893, 6 pages.
Office Action in U.S. Appl. No. 12/730,533 dated Jun. 7, 2012, 6 pages.
Response to Office Action in U.S. Appl. No. 12/730,533 dated Jun. 7, 2012, filed Jul. 9, 2012, 1 page.
Notice of Allowance dated Aug. 1, 2012, U.S. Appl. No. 12/730,533, 8 pages.
U.S. Appl. No. 13/550,890 Notice of Allowance dated Sep. 2, 2014, 16 pages.
U.S. Appl. No. 13/329,682 Response to Office Action filed on Sep. 2, 2014, 8 pages.
Notice of Allowance in U.S. Appl. No. 13/826,926 dated Aug. 19, 2013, 11 pages.
Office Acton in U.S. Appl. No. 12/826,926 dated Dec. 27. 2013, 9 pages.
U.S. Appl. No. 13/329,682 Office Action dated Mar. 31, 2014, 11 pages.
Office Action dated Jul. 31, 2014 for U.S. Appl. No. 13/331,334, filed Dec. 20, 2011 20 pages.
U.S. Appl. No. 13/826,926, Response filed on Jun. 25, 2014 7 pages.
U.S. Appl. No. 13/826,926 Notice of Allowance dated Mar. 14, 2013 6 pages.
U.S. Appl. No. 13/331,334 Notice of Allowance dated Jan. 13, 2015 14 pages.
Response filed Nov. 25, 2014; to Office Action dated Jul. 31, 2014; for U.S. Appl. No. 13/331,334; 9 pages.

* cited by examiner

METHOD AND APPARATUS FOR REJECTING INTERMODULATION PRODUCTS

CROSS REFERENCE TO RELATED APPLICATIONS

The present application is a continuation of U.S. patent application Ser. No. 12/730,533, filed on Mar. 24, 2010, which claims the benefit of U.S. Provisional Patent Application No. 61/163,266, filed on Mar. 25, 2009, and U.S. Provisional Patent Application No. 61/163,274, filed on Mar. 25, 2009, which are incorporated herein by reference.

BACKGROUND

As is known in the art, one issue in continuous wave (CW) radars, such as FMCW and interrupted CW, is that part of the transmitted signal leaks through to the receiver and can degrade dynamic range performance. Usually in a CW radar, transmission and reception occur on the same antenna resulting in a direct path feedthrough. However, feedthrough can also occur in radars in which the transmitting antenna is separated from the receiving antenna, the target of interest is far from both, and some of the transmitted signal reflects from a cloud or other object entering the receiver ahead (in time) of the reflected target signal. The feedthrough can also mix with real target return to generate false intermodulation product targets.

Prior art techniques for addressing intermodulation products include increasing the third order intercept point (TOI) of low noise amplifiers in the front end of phased array antennas to reduce the level of the intermodulation product. However, this requires increasing the size of the LNAs and other receiver components, which can significantly increase cost, consumed power, and complexity.

SUMMARY

The present invention provides methods and apparatus for a radar system to reject intermodulation products by rejection of direct transmit feedthrough into a receive array and/or to provide for rejection of intermodulation products due to mixing of transmit and receive signals. In exemplary embodiments, rejection of direct transmit feedthrough into the receive array can include changing a transmit frequency if a first signal return is expected during a second signal transmission, providing a frequency gap between first and second signal transmission, providing a bank of filters in receivers to reject direct transmit signal, and/or configuring a receiver notch filter frequency to a transmit signal frequency. In exemplary embodiments, rejecting intermodulation products due to mixing of transmit and receive signals can include randomizing super-element lengths and/or positions in the array, transmitting signals outside of a frequency range that can contain current receive signal returns, and/or providing frequency gaps between groups of receive signal returns within which false target intermodulation products can fall.

In one aspect of the invention, a method comprises transmitting a first signal at a first time at a first frequency to detect a target within a first altitude range, determining a range from a first receive time to a second receive time for possible signal return from the target within the first altitude range, and receiving the possible signal return from the target in a frequency band of interest based upon the first frequency while transmitting a second signal at a second frequency spaced a selected frequency distance from the first frequency to place transmit feedthrough outside of the receive frequency band of interest and false target return outside the frequency band of interest for rejecting intermodulation products.

The method can further include one or more of the following features: providing a gap between the first and second frequencies in which real radar return will not be received and intermodulation products will fall, the first altitude range is from about 100 km to about 42,000 km, the target is a satellite, randomizing super-element position in the array, and randomizing super-element length.

In another aspect of the invention, a radar system comprises a receive aperture and a separate transmit aperture, and an exciter to enable transmitting a first signal at a first time at a first frequency to detect a target within a first altitude range and determine a range from a first receive time to a second receive time for possible signal return from the target within the first altitude range, wherein the possible signal return from the target is received in a frequency band of interest based upon the first frequency while transmitting a second signal at a second frequency spaced a selected frequency distance from the first frequency to place transmit feedthrough outside of the receive frequency band of interest and false target return outside the frequency band of interest for rejecting intermodulation products.

The system can further include one or more of the following features: a gap between the first and second frequencies in which real radar return will not be received and intermodulation products will fall, the first altitude range is from about 100 km to about 42,000 km, the target is a satellite, the receive aperture includes a series of super-elements having randomized positions in the array, the receive aperture includes a series of super-elements having randomized lengths, and the exciter includes a GPS-disciplined signal source.

In a further aspect of the invention, a radar system comprises a transmit array, a receive array spaced from the transmit array to provide dual aperture full duplex operation, a first beamformer system coupled to the transmit array via a power amplifier system, a low noise amplifier (LNA) system coupled to the receive array, a second beamformer system coupled to the LNA system, a receive system coupled to the second beamformer, a signal processor coupled to the receiver system, and an exciter coupled to the first and second beamformers, the exciter including a frequency scheduling module to schedule transmit frequencies so that the frequency of signal from the transmit array is not received as signal return by the receive array.

BRIEF DESCRIPTION OF THE DRAWINGS

The foregoing features of this invention, as well as the invention itself, may be more fully understood from the following description of the drawings in which.

DETAILED DESCRIPTION

In general, exemplary embodiments of the present invention provide methods and apparatus for a radar system that rejects intermodulation products. In exemplary embodiments, intermodulation products are rejected by placing transmit signals in frequency bands with no receive target returns, spacing signals in frequency so that intermodulation products fall outside the band of interest, and/or rejecting transmit signals with filters, as described in detail below.

It is understood that intermodulation products (IMP) occur in phased array radars due to nonlinear effects in the front end low noise amplifiers (LNAs) and other components. Intermodulation products can also occur if a large signal (frequency=$f_o$) and a small signal mix (e.g., $f_1 = f_o + \Delta f$) at the input of the LNA. This can generate an IMP in the LNA having frequency $f_2 = f_o - \Delta f$. This IMP can appear as a false target. The amplitude (dB) of the IMP is equal to the amplitude (dB) of the small signal at $f_1$, minus $2 \times (TOI - P(f_o))$, where TOI is the input Third Order Intercept point (dB), and $P(f_o)$ is the amplitude (dB) of the large signal. For dual aperture, full duplex phase array radar to detect and track satellite targets, $P(f_o)$ is the feedthrough from the transmit antenna into the receive antenna, and can cause the radar to see false targets at frequency $f_2 = f_0 - \Delta f$.

It is understood that an exemplary radar system is shown and described having particular frequencies, filter characteristics, super-element embodiments, and components. It is further understood that other frequencies, filter characteristics, and practical components can be used in other embodiments to meet the needs of a particular application without departing from the scope of the invention. In addition, while exemplary embodiments are described in conjunction with tracking satellites, it is understood that the inventive embodiments are applicable to radar systems in general in which it is desirable to attenuate feedthrough.

Figure 1:
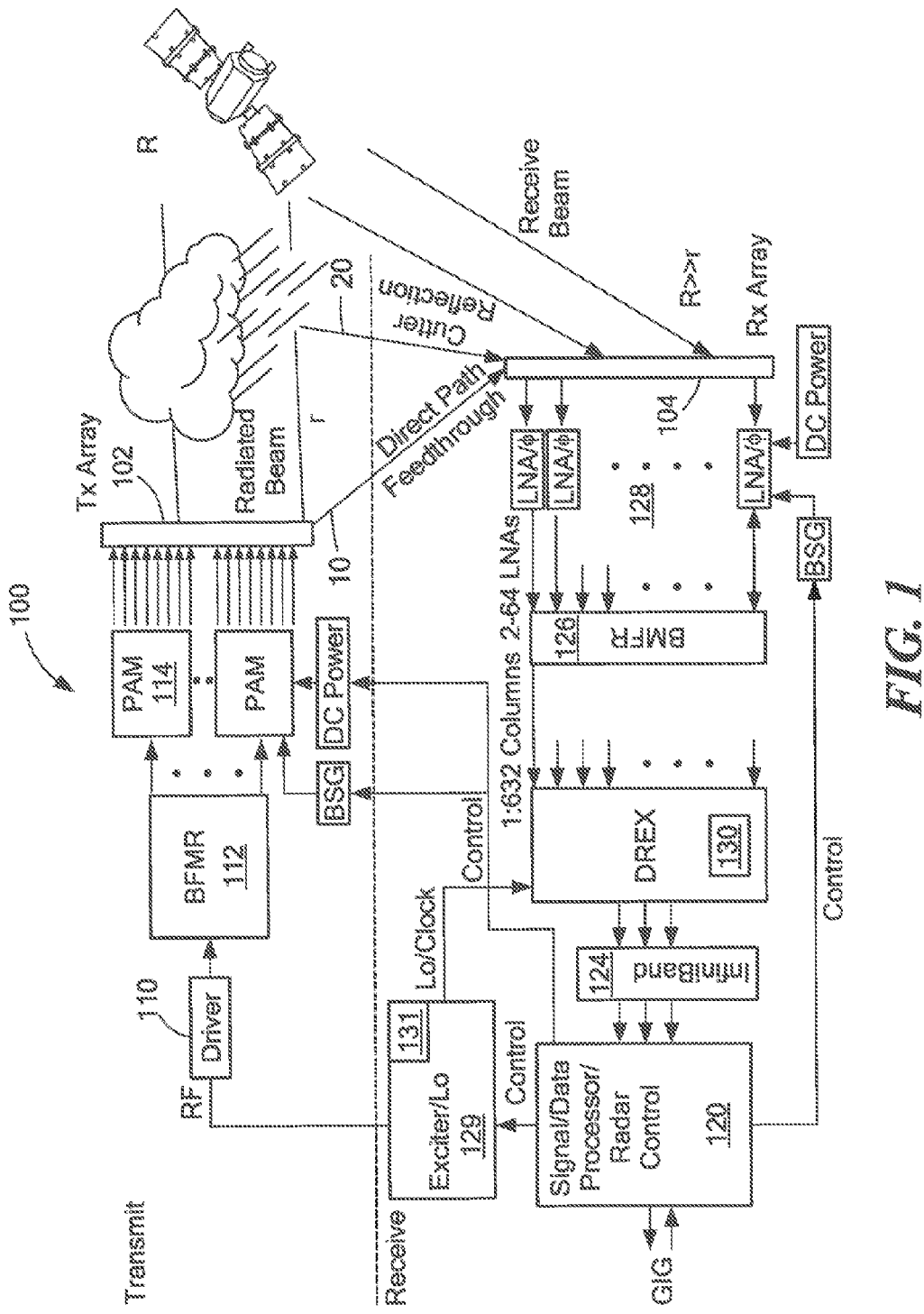
FIG. 1 is a schematic depiction of an exemplary radar system that can reject intermodulation products in accordance with exemplary embodiments of the invention.

FIG. 1 shows an exemplary phased array satellite tracking radar system 100 that can reject intermodulation products in accordance with exemplary embodiments of the invention. The satellite tracking phased array radar 100 has separate transmit and receive arrays 102, 104 with a remote target illustrating direct path feedthrough 10 and feedthrough 20 from a near object in the form of a weather formation. The system 100 includes on the transmit side a driver 110 coupled to a digital beamformer 112 feeding a PAM (Power Amplifier Module) 114, which energizes the transmit array 102. The receive side includes a signal data processor control module 120 coupled to a digital receive system 122 via a universal I/O switch matrix 124, such as InfiniBand. The receive beamformer 126 receives input from the low noise amplifiers 128, which are coupled to the receive array 104. The digital beamformer 122 can include a filter module 130, which can include a notch filter and/or a bank of filters, to remove the present transmitted frequency, as described in below. The system 100 includes an exciter/LO 129 with a frequency scheduling module 131 to schedule transmit frequencies so that the frequency of signal from the transmit array is not received as a target signal return by the receive array.

Figure 2:
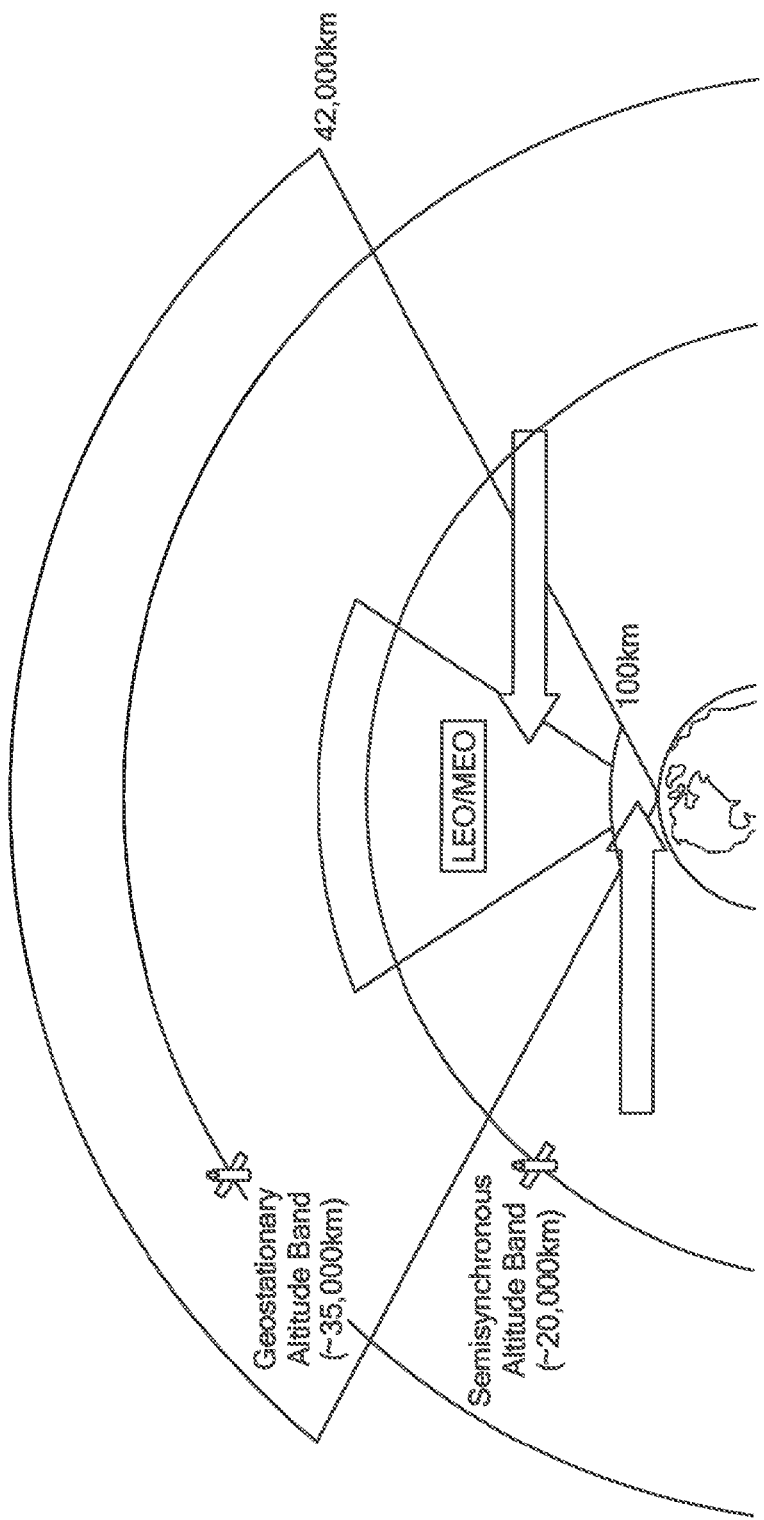
FIG. 2 is a schematic depiction of a coverage area of a satellite detection and tracking radar system having intermodulation product rejection.
Figure 2A:
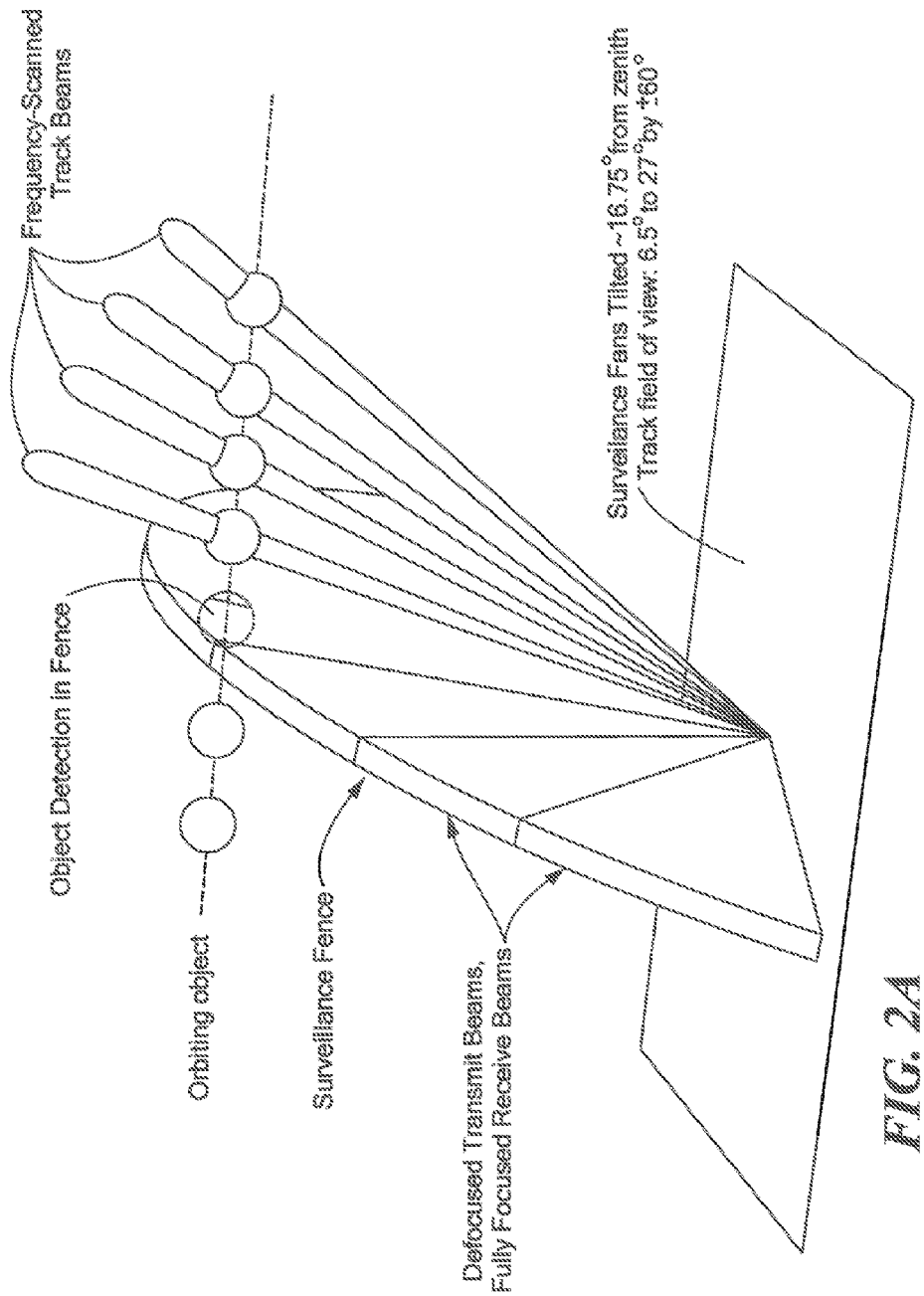
FIG. 2A is a schematic depiction of receive operation for a space 'fence' radar system to detect and track satellites having intermodulation product rejection.

As shown in FIG. 2, satellite targets can be tracked from an exemplary range of about 100 km to about 42,000 km in altitude. FIG. 2A shows receive operations for a space 'fence' radar system to detect and track satellites having intermodulation product rejection. Low earth orbit (LEO) targets and medium earth orbit (MEO) targets can have certain altitudes. This range translates to signal return delays ranging from about 0.66 ms to about 280 msec.

Figure 3:
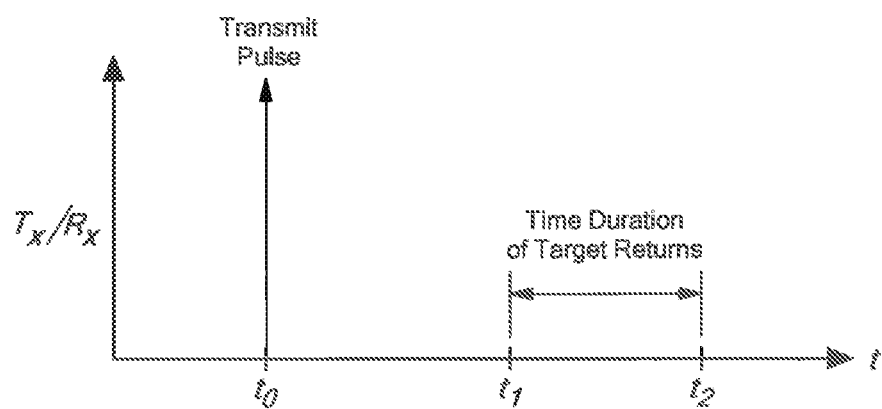
FIG. 3 is a graphical representation of signal transmission and return times for frequency transmission scheduling.

As shown in FIG. 3, a signal transmitted from the transmit array at time t0 can return from a satellite target at an earliest time t1 and a latest time t2. For a given transmit time for a given frequency f0, the range of possible return times is known. With this knowledge, in an exemplary embodiment signals can be transmitted at frequencies for which no real signal return can be received at that time. Even at dual aperture, full duplex operation, the transmitter frequency schedule is constructed so that the transmitted frequencies are exclusive of the real signal return frequencies. With this arrangement, dominant false target returns are outside of the real target return frequency band so that false targets can be readily identified.

Figure 4:
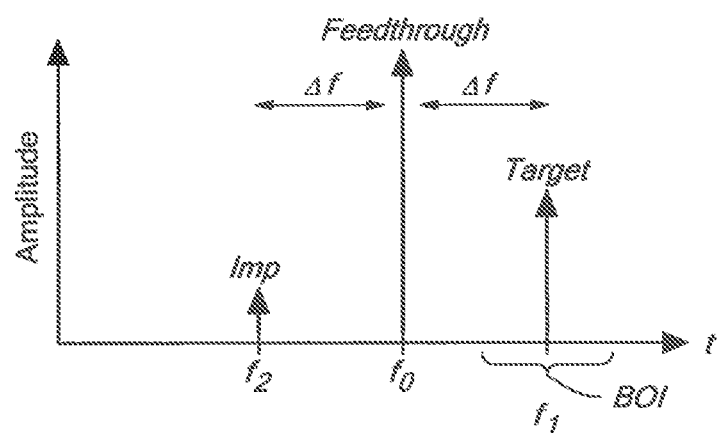
FIG. 4 is a graphical representation of transmission frequency, target return frequency, and intermodulation product frequency.

As shown in FIG. 4, a feedthrough signal at f0 can be placed outside a frequency Band Of Interest (BOI) that can contain target signal return at frequency f1. Intermodulation products IMP at frequency f2 are also outside the frequency band of interest BOI. It is understood that the minimum frequency difference between transmit and receive frequencies can vary to meet the needs of a particular application having given operating parameters, such as transmit signal bandwidth and filter considerations. In one particular embodiment, a minimum transmit/receive frequency difference is in the order of 1 MHz.

Figure 5:
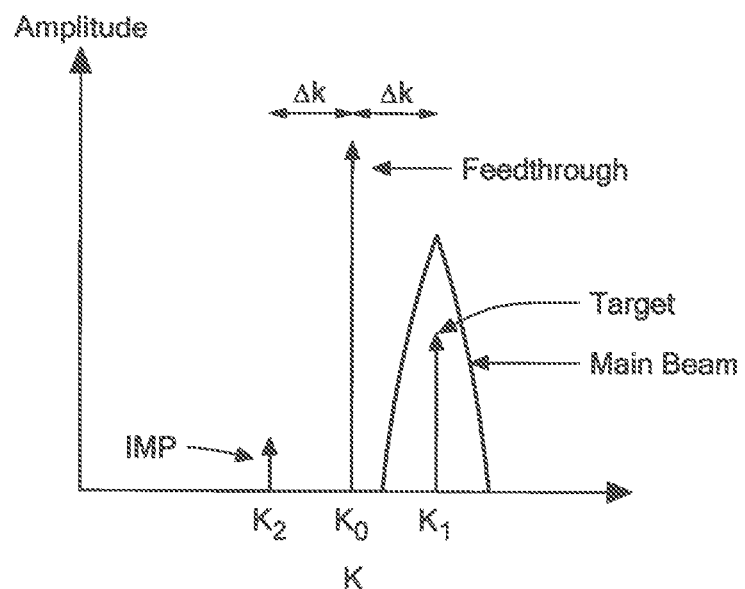
FIG. 5 is a graphical representation of k vector intermodulation product shifting.

As shown in FIG. 5, there can be a similar arrangement for $\sin \theta$ ($\theta$=angle of incidence of receive signal)

$$k = 2\pi/\lambda \cdot \sin \theta$$

$$k_o = k \text{ of feedtrough}$$

$$k_1 = k \text{ of target} = k_o + \Delta k$$

$$k_2 = k \text{ of IMP} = k_o - \Delta k$$

As with frequency, the k vector of the intermodulation products is shifted from the k vector of the real targets by $\Delta k=k0-k1$. If the $\Delta k$ due to the difference between the real target incidence angle and the interferer incidence angle is large enough to put the false target outside the main beam, additional IMP discrimination is provided.

Figure 6:
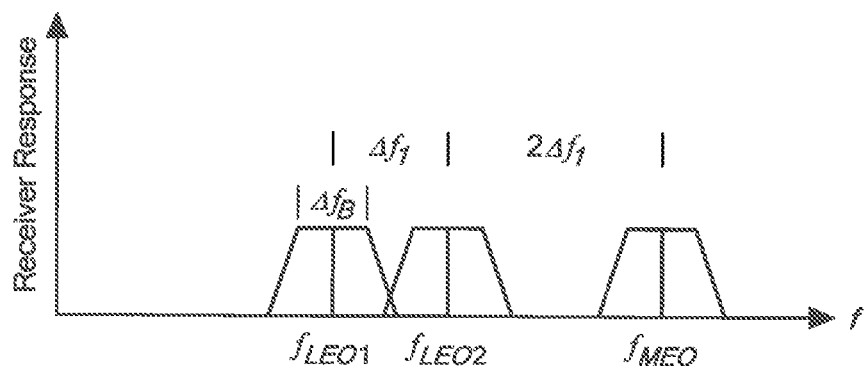
FIG. 6 is a graphical representation of an exemplary surveillance frequency plan.

FIG. 6 shows an exemplary surveillance frequency plan for the system of FIGS. 1 and 2 to reject undesired intermodulation products. A first LEO surveillance frequency has a center frequency at fLEO1 and a bandwidth $\Delta fB$ and a second LEO surveillance frequency has a center frequency at fLEO2 a frequency difference from the center frequencies is $\Delta f1$. A first MEO surveillance frequency is centered at fMEO.

To achieve immunity from intermodulation products, the frequency relationships are set forth below:

$$fLEO2=fLEO1+\Delta f1$$

$$fMEO=fLEO2+2\Delta f1$$

$$\Delta f1 > \Delta fB$$

With this arrangement, false targets fall outside of the surveillance windows.

Figure 7:
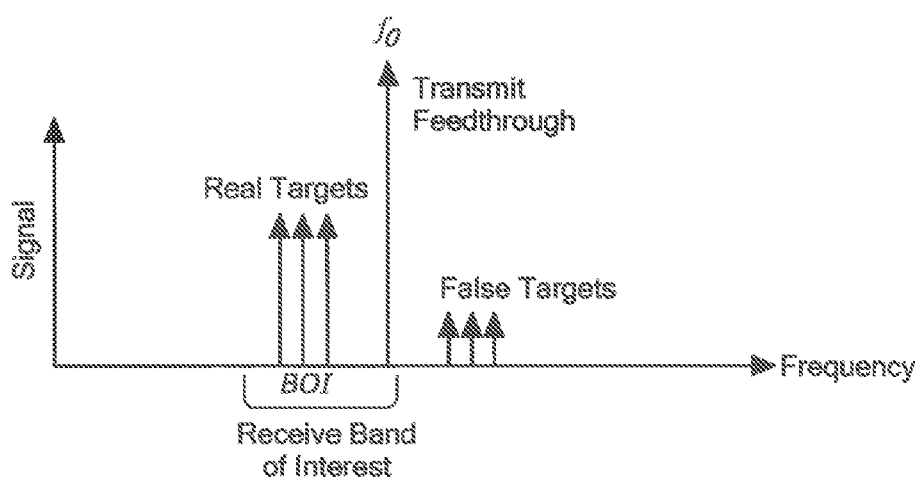
FIG. 7 is a graphical representation of transmit feedthrough frequency, real target return band of interest, and false target return frequency.

As shown in FIG. 7, the transmit frequency f0 can be manipulated with respect to the frequency of the incoming target return. As can be seen, the system can transmit in the BOI as long as there is not expected target return at the transmit frequency. In the illustrated embodiment, intermodulation products (false targets) are outside the BOI as desired.

Referring again to FIG. 6, the transmit frequency can be kept away from real target return in the band of interest. The first LEO frequency fLEO1 is transmitted and then the second LEO frequency fLEO2 is transmitted. While the second LEO frequency fLEO2 is transmitted, signal return from the first LEO frequency is received in the BOI. False targets are at a higher frequency beyond the transmit feedthrough and receive band of interest BOI. As the transmit frequency increases, the transmit feedthrough and receive band of interest BOI frequency also increases along with the location of the false targets. However, since there is no overlap, intermodulation products are rejected by the frequency scheduling scheme.

Figure 8A:
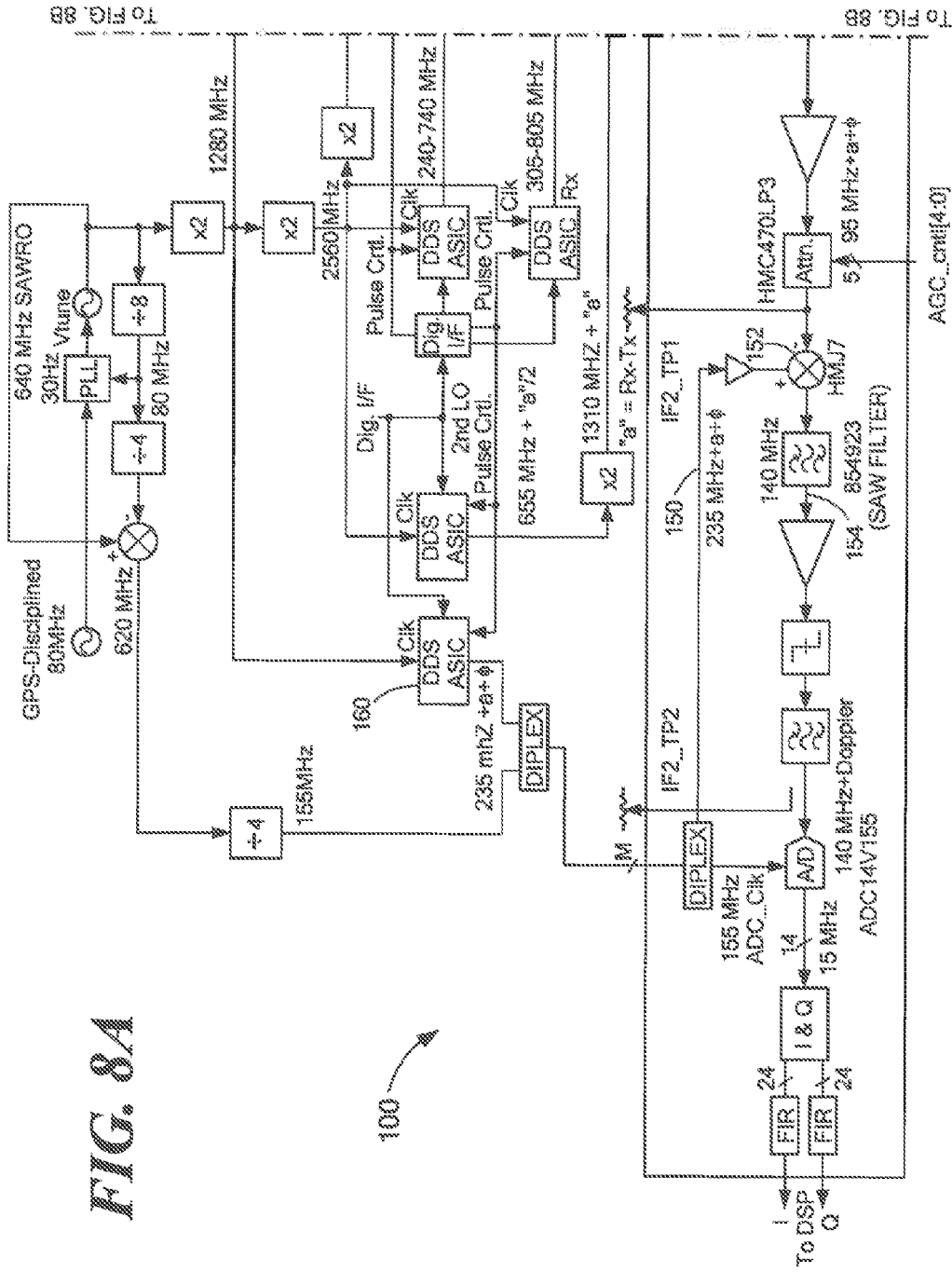
FIGS. 8A and 8B are a schematic representation of an exciter/receiver to control transmit frequency scheduling.
Figure 8B:
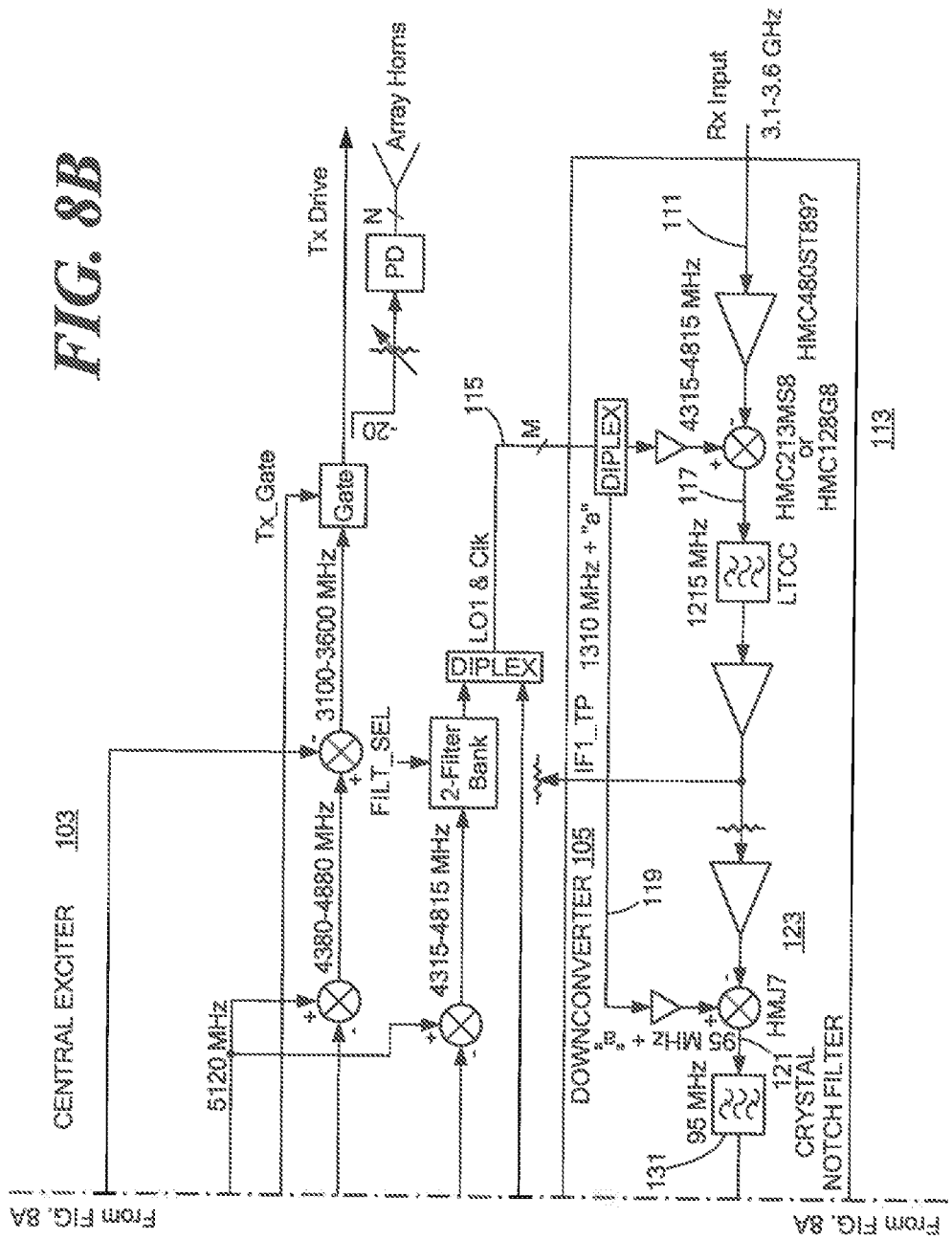

In one aspect of the invention shown in the exemplary embodiment of FIGS. 8A, 8B, the synthesizer is GPS-disciplined, so that the receiver 'knows' the transmit frequency precisely. The system 100 includes a central exciter module 103 coupled to a downconverter module 105. The exciter module 103 receives a GPS-disciplined 80 MHz signal from which the desired signal frequency signals are generated for use by the downconverter module 105 to provide I and Q signals to the signal processor.

In the illustrated embodiment, the receive signal 111 from the receive array ranges from 3.1 to 3.6 GHz and is provided to a first port of a first mixer 113. A first LO 115 is tuned from 4315 MHz to 4815 MHz and provided to the first mixer 113 such that the first IF 117 output from the first mixer 113 is centered at 1215 MHz. The 1215 MHz first IF signal 117 is provided to a second mixer 123.

A second LO 119 is tuned at 1310 MHz plus some offset "a" such that a second IF 121 output from a second mixer 123 is 95 MHz+"a" (1310−1215=95). In an exemplary embodiment, offset "a" corresponds to a difference between the present transmitted frequency and the signal being received. Note that offset "a" can be either positive or negative.

The second IF signal 121 is passed through a filter 131 having a stop band or notch at 95 MHz to attenuate the presently transmitted signal, i.e., the feedthrough. The second IF signal is then processed for phase and/or frequency change due to the filter, as described more fully below, by a third mixer 152.

In an exemplary embodiment, the filter 131 has a stop band or notch that remains constant. In other embodiments, the notch can be tuned to a desired frequency. The offset "a" is effective to move the presently transmitted frequency to a particular intermediate frequency at the stop band of the filter. The remaining signal, including the signal return from the target, passes through the filter.

Figure 8C:
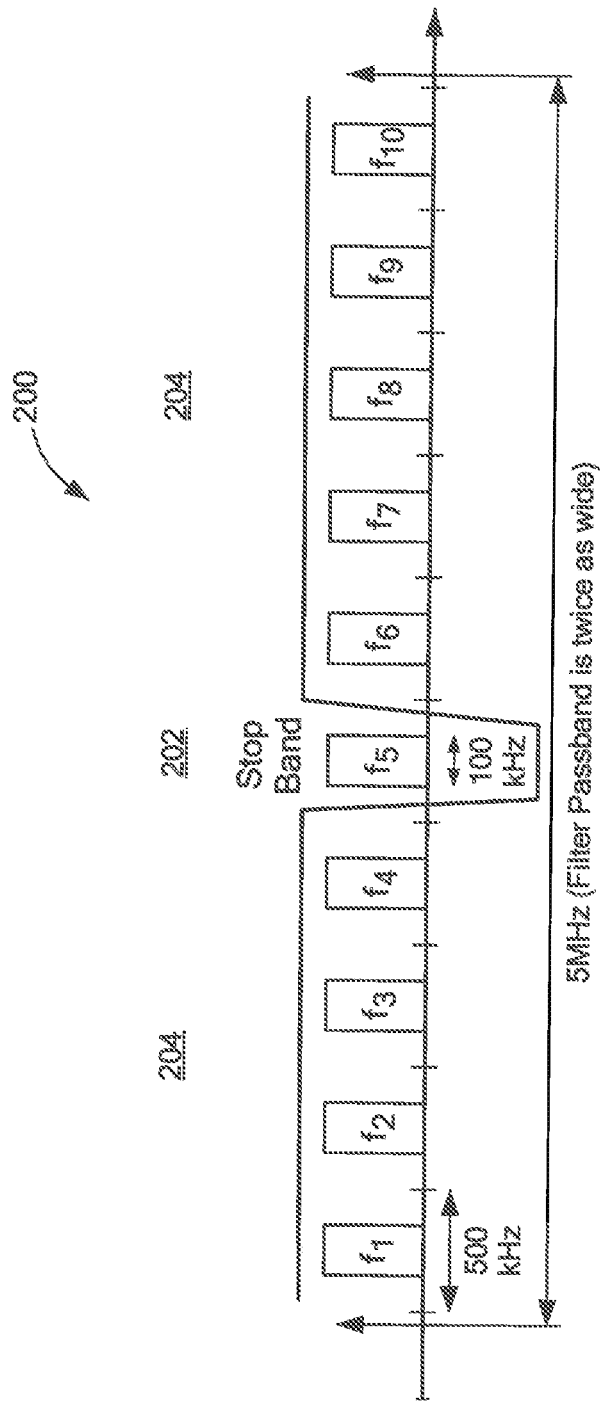
FIG. 8C is a pictorial representation of a stop band for the exciter/receiver of FIGS. 8A and 8B.

FIG. 8C shows an exemplary filter 200 having a stop band 202 and adjacent bandpass regions 204. In the illustrated embodiment, the presently transmitted signal frequency $f_5$ is attenuated by the stop band 202 of the filter while the remaining frequencies pass through the filter in the bandpass regions 204. In one embodiment, the stop band 202 is in the order of 100 kHz. The bandpass region 204 of the filter 200 is twice the second IF bandwidth occupancy so that $f_1$ could be attenuated while receiving $f_{10}$ and vice versa.

If the present transmit frequency changes again during reception on the same receive frequency, the local oscillator frequency can be changed to put the new transmit frequency into the notch again. It is understood the transmit frequency can be readily maintained in the notch if the receive frequency changes, providing the notch filter passband permits reception of the entire receive band.

Figure 8D:
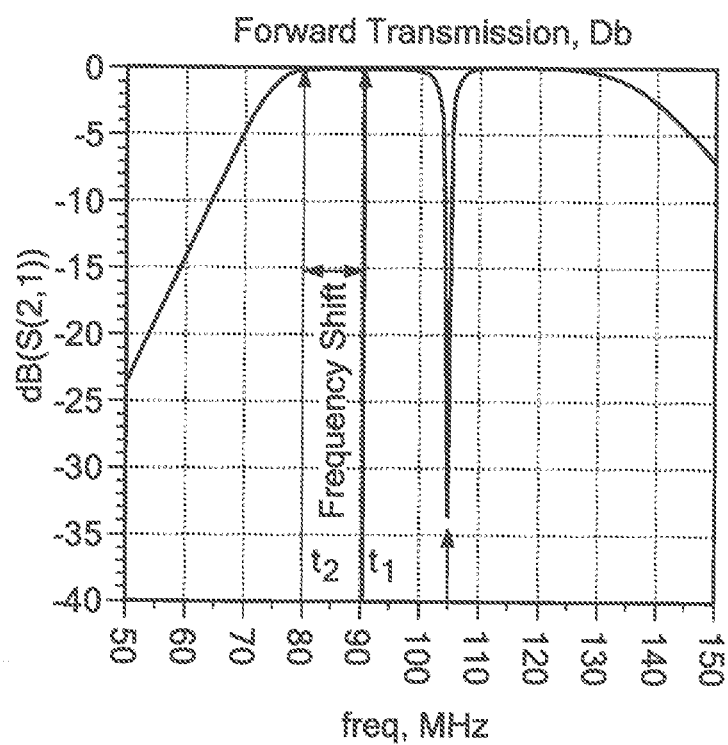
FIG. 8D is a graphical representation of a notch filter for the exciter/receiver of FIGS. 8A and 8B.

FIG. 8D shows for a first time $t_1$ a receive signal having a frequency that is 15 MHz below a present transmit frequency, e.g., offset $a_1$ is −15 MHz. The stop band is shown at 105 MHz in the illustrated embodiment. At a second time $t_2$, the presently transmitted frequency increases 10 MHz so offset $a_2$ is −25 MHz. So that the new presently transmitted frequency is at the stopband of the filter, the LO moves 10 MHz down moving the receive frequency further over in the bandpass region of the filter.

With this arrangement, the transmit frequency can be selected so that no significant transmit signal return will be received by the analog-to-digital (ADC). The transmitter frequency schedule is constructed so that the transmitted frequencies are exclusive of the real signal return frequencies. That is, dominant false target returns are outside of the real target return frequency band so that false targets can be readily identified.

Figure 9:
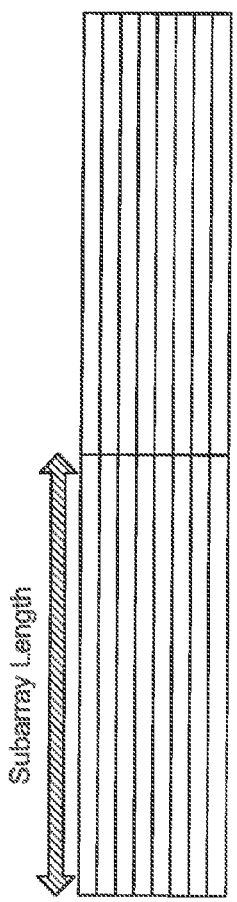
FIG. 9 is a schematic depiction of an array having columns of super-elements.
Figure 10:
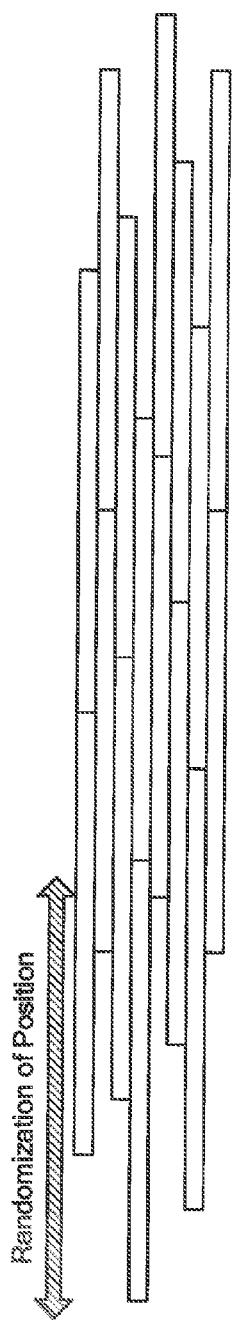
FIG. 10 is a schematic depiction of an array having columns of super-elements randomized in position.
Figure 10A:
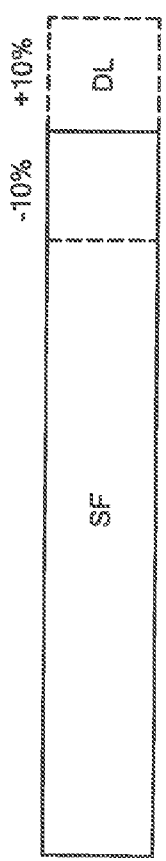
FIG. 10A is a schematic depiction of a super-element randomized in length.

In another aspect of the invention, super-elements can be randomly positioned to reduce sidelobes and further reduce intermodulation products. FIG. 9 shows a series of super-elements/subarrays SE arranged at regular intervals for forming a symmetrical arrangement that can result in unacceptable sidelobe levels. FIG. 10 shows an exemplary arrangement of super-elements/subarrays SE making up a portion of an antenna aperture randomized in position along length in accordance with exemplary embodiments of the invention. FIG. 10A shows randomization in super-element length in accordance with exemplary embodiments of the invention. A first super-element SE has a selected length and a second super-element has a length that can vary by an amount DL. In an exemplary embodiment, the amount DL can vary, such as +/−ten percent of the length of the first super-element SE. In one embodiment, the length of super-elements in an array can vary randomly with a desired granularity, e.g., 0.5 percent of the length of the first super-element SE. In a further embodiment, the super-element length varies but in an ascending and/or descending configuration. As discussed in detail below, randomization of the super-elements significantly reduces sidelobe levels and enhances array performance with minimal impact on cost of manufacture and complexity of operation. This randomization also reduces sidelobe levels, which further aids in rejecting intermodulation products.

Before describing in detail exemplary embodiments of the inventive super-element radiator location randomization to reduce sidelobes, some information is provided. As is known in the art, a super-element radiator comprises a number of individual radiator elements coupled to a common transmission line.

Figure 11:
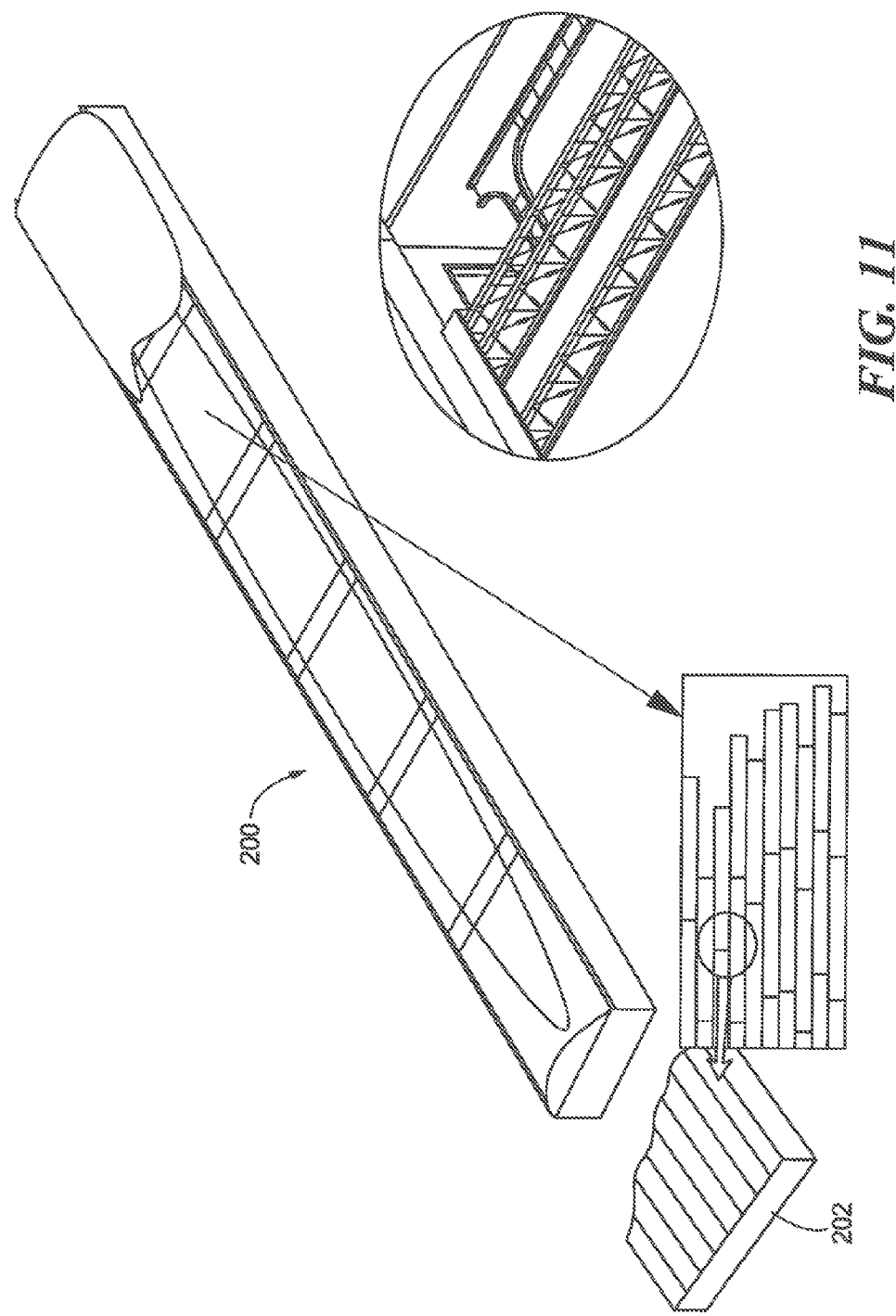
FIG. 11 is a pictorial representation of a super-element forming a part of an antenna aperture.

FIG. 11 shows an array implementation using exemplary embodiments of the super-element radiator array. An array 200 includes a number of super-element radiators 202 having a number of radiator elements. The array uses a frequency-scanned super-element approach that provides significant benefits.

Figure 12:
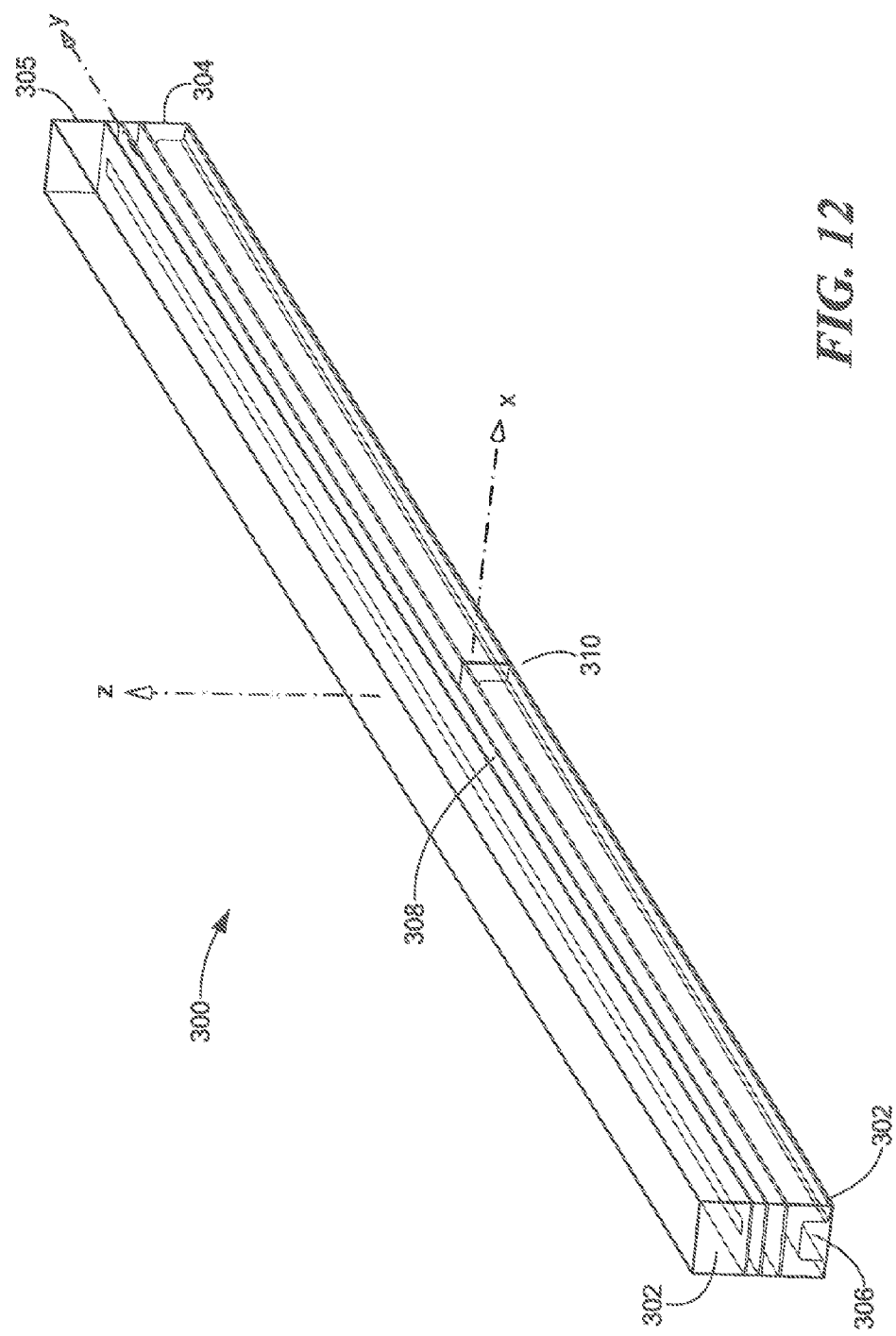
FIG. 12 is a diagrammatic representation of a super-element.
Figure 13:
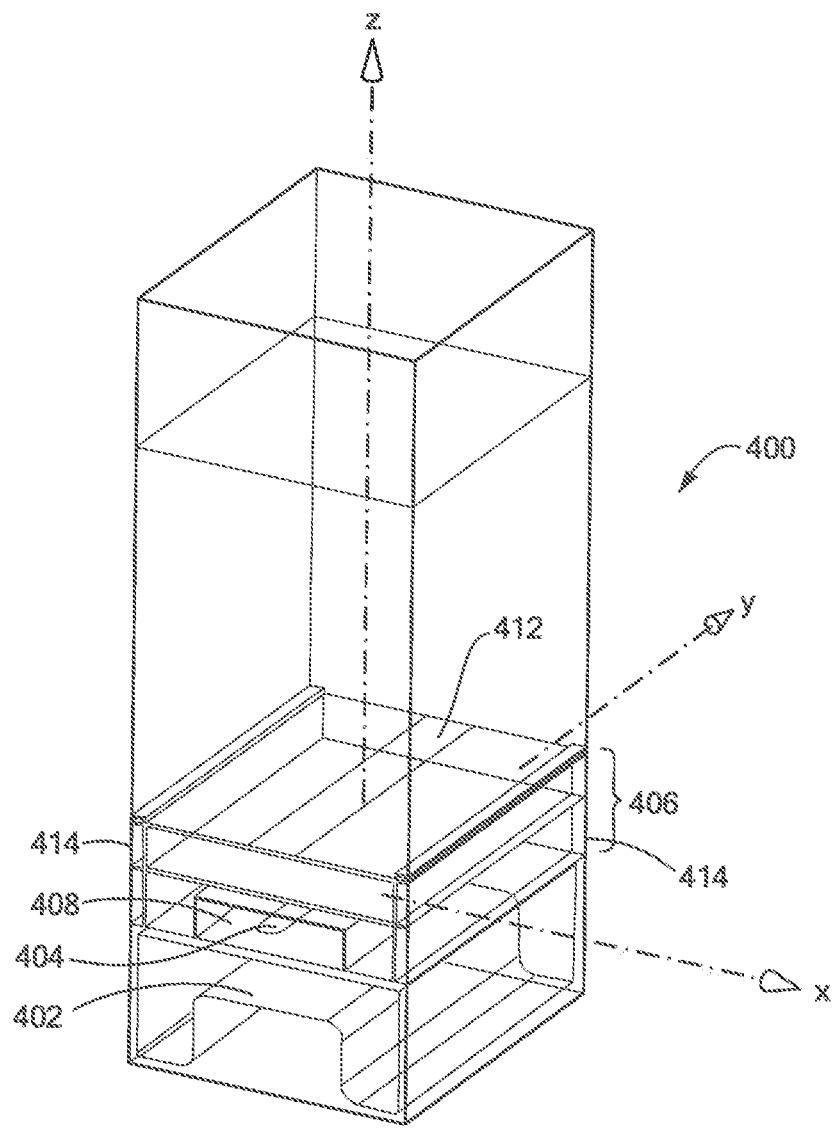
FIG. 13 is a depiction in model form of a unit cell of a super-element.

FIG. 12 shows an exemplary super-element radiator 300 and FIG. 13 shows a unit cell 400 in the super-element. The super-element 300 includes an input port 302 and a termination port 304. Radiation boundaries 304 are disposed in the xz plane above a ridged waveguide 306 that extends along an axis of the super-element Master/slave walls 308 are located on the sides in yz plane above the waveguide 306. Note that a split 310 in the waveguide is shown for modeling purposes to help the meshing process.

Figure 14:
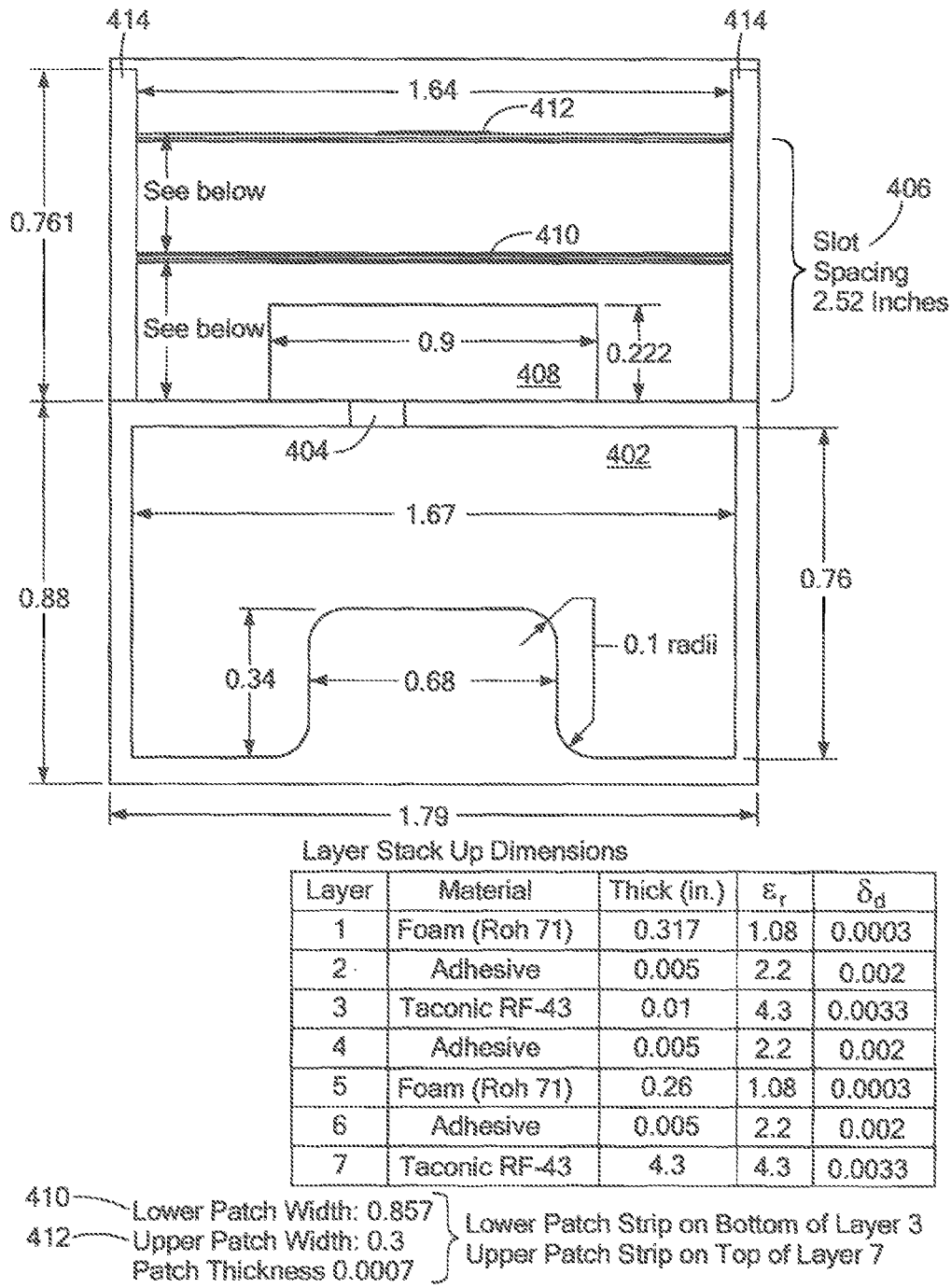
FIG. 14 is a cross-sectional view of a super-element.
Figure 15:
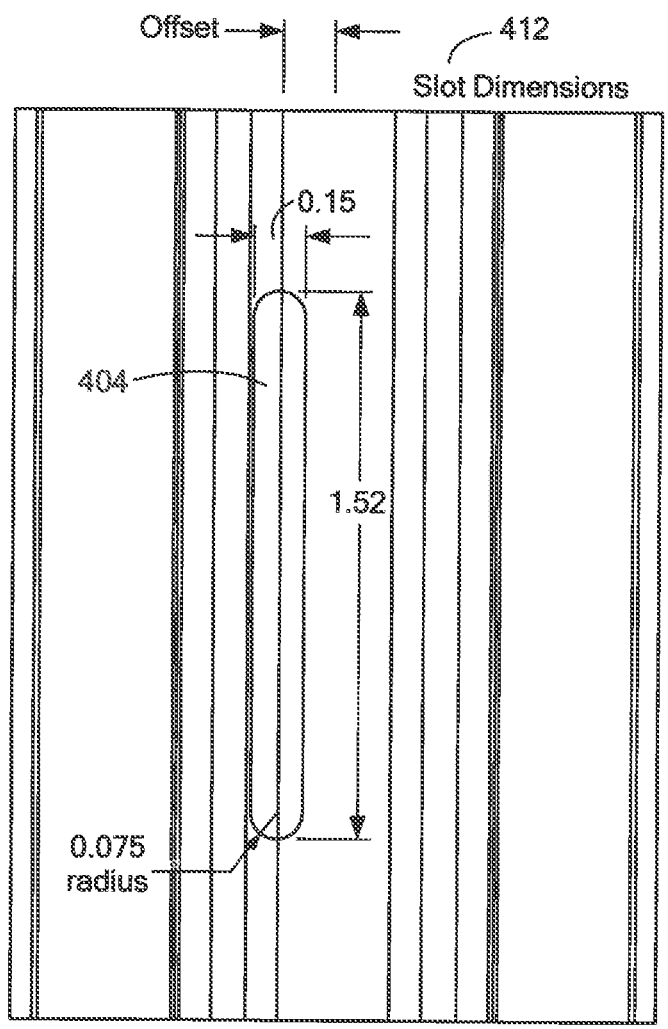
FIG. 15 is a top view of a portion of a super-element.

FIG. 14 shows some further detail for a unit cell 400 of the radiator. The unit cell includes a single ridge waveguide 402, which is well known in the art. With a feed port at one end of the super-element and a termination at the other end, the super-element acts as a transmission line distributing electromagnetic power to each of the unit cells. The upper conductive wall of the waveguide is interrupted with a slot coupler 404 (see FIG. 15). A dielectric assembly 406 is disposed over the waveguide 402. In an exemplary embodiment, the dielectric assembly includes a channel 408 and a layer stack shown in detail in FIG. 14, which shows exemplary dimensions for the unit cell 400. The dielectric assembly includes first (shown in FIG. 14) and second conductive strips or patches 410, 412 located at first and second heights above the coupling slot 404. The resonant conductive strips 410, 412 are suspended with low loss foam dielectric materials in a single sub-assembly. In an exemplary embodiment, the strips 410, 412 are continuous over the full length of the super-element. Conductive walls 414 enclose the dielectric and strip subassembly, also running the full length of the super-element. The conductive walls 414 form a long slot radiator, with an opening extending the full length of the super-element. As shown in FIG. 14, the coupler 404 is approximately 1.52 inches long, 0.15 inches wide, with semi-circular ends, and is cut out of the full height of the upper waveguide wall.

Figure 16A:
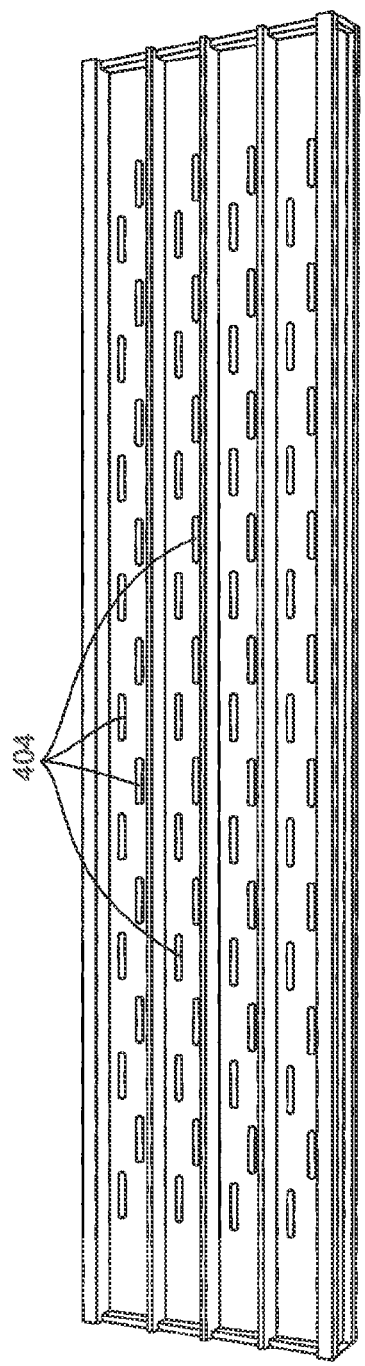
FIGS. 16A-C show a pictorial representation of a super-element assembly with FIG. 15B showing the super-element with a form core assembly.
Figure 16B:
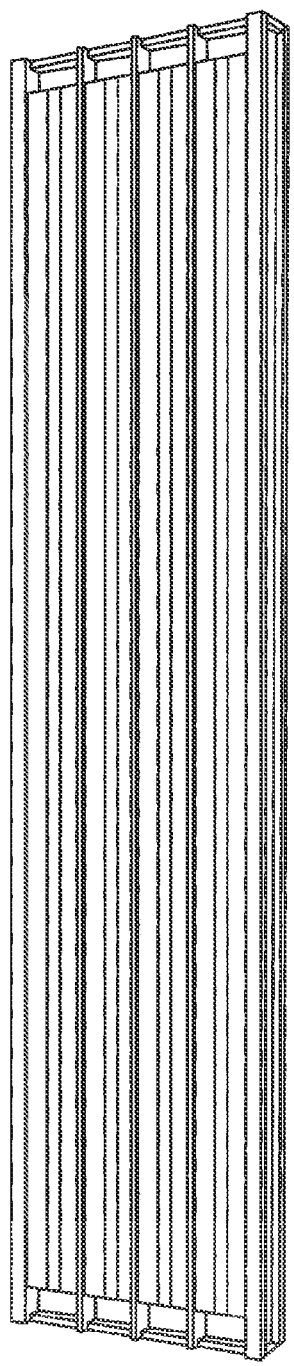
Figure 16C:
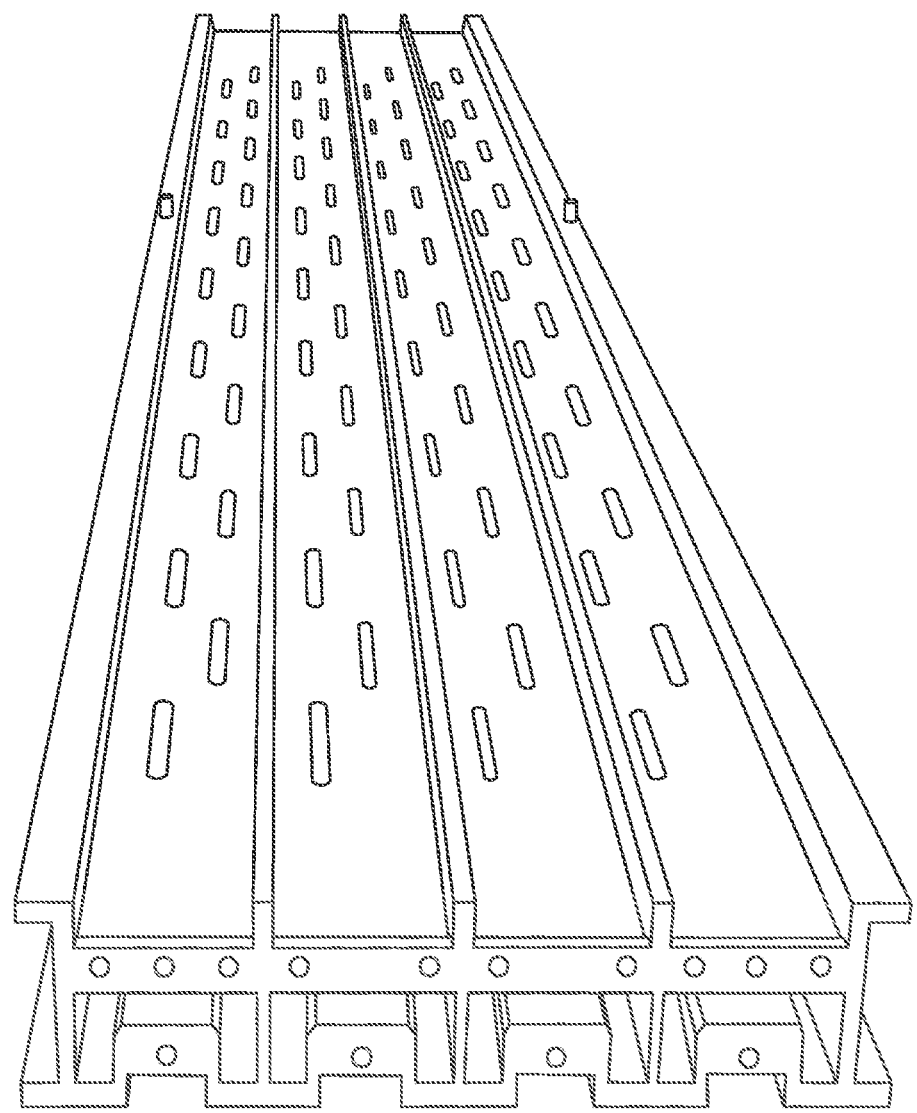

FIGS. 16A-C show pictorial representations of super-element radiators in accordance with exemplary embodiments of the invention. FIGS. 16A and 16C show the super-element assembly without the dielectric assembly. FIG. 16B shows the super-element assembly with dielectric/foam core assemblies.

In an exemplary large radar aperture, super-elements are formed from slotted waveguide arrays, which are spaced side-to-side by approximately $\lambda/2$, but which have a length much greater than $\lambda$ (wavelength). In this long dimension, grating lobes appear in the far field patterns due to quantization effects in the aperture taper. A uniform illumination along each super-element is assumed. Also, as the array is scanned, grating lobes can be formed when the instantaneous frequency is different than the frequency at which the array is steered. Since the latter effect may be larger than the former, focus is directed to these frequency-driven grating lobes or sidelobes and non-uniform illumination taper.

While slotted waveguide super-elements are shown, it is understood that randomization of super-element features in accordance with exemplary embodiments of the invention is applicable to super-elements in general for which it is desirable to reduce sidelobes. For example, stripline fed super-element embodiments can include randomization in alternative embodiments of the invention.

Grating lobes appear when the array factor grating lobes stray off of the null in the super-element pattern. For an array of super-elements, the far field pattern can be expressed as $$V(k) = \frac{\sin((k-ko)dN/2) * \sin((k-kso)d/2)}{\sin((k-ko)d/2)*(k-kso)d/2} \qquad \text{Eq. (1)}$$

where there are N super-elements in a column, each of length $d \gg \lambda$, $k=2\pi/\lambda * \sin\theta$, where $\theta$ is the viewing angle along the column direction, ko is the k to which the array is scanned, and kso is the scan angle of the super-element. Element kso is a function of the instantaneous frequency f, whereas ko is fixed. For an instantaneous frequency $f \neq fo$, $ko \neq kso$. Equation 1 shows that when $$k=ko+/-2\pi/d \text{ and } f=fo, \qquad \text{Eq. (2)}$$

the grating lobe of the array factor appears at the null of the super-element pattern. However, for $f \neq fo$, the grating lobe moves off of the super-element pattern null, and a significant sidelobe can appear.

Equation 1 corresponds to FIG. 9, where super-elements are spaced in a regular lattice. FIG. 10 shows randomization of the starting location of each column, leaving the column-to-column spacing and the super-element length d constant. This leads to modifying Equation 1 by multiplying by the factor $$F(k, ko) = \sum_{i=1}^{M} \exp(j(k-ko)d\delta_i) \qquad \text{Eq. (3)}$$

where the sum is performed over M columns of the array, the starting position of column i is $d\delta_i$, and $\delta_i$ is a random number from 0 to 1. If one looks at the first array factor grating lobe that appears at $k=ko+2\lambda/d$, the average of F is zero. The rms value will be 1/M. There is no effect on the mainlobe of the array, and the grating lobe level is suppressed by 1/M.

Exemplary embodiments of the present invention enable the reduction of peak sidelobe levels due to super-element grating lobes by randomizing the positions of the super-elements in a column-to-column basis. This arrangement does not generate an increase in cost for the array electronics or beamformer. In one embodiment, the array is built in groups of columns, e.g. eight, that are not shifted, but instead shift the column groups randomly with respect to each other. This will result in an increase in sidelobe level by 10 log K, where K is the size of the column group. In the example, the array has 632 columns, which should give a grating lobe reduction of approximately 28 db. While super-elements are shown in exemplary embodiments as abutting each other, other embodiments include super-elements having an offset, from an end and/or side, of an adjacent super-element. This reduction in peak sidelobe levels also discriminates against intermodulation products or false target returns (see, e.g., FIG. 5).

Figure 17:
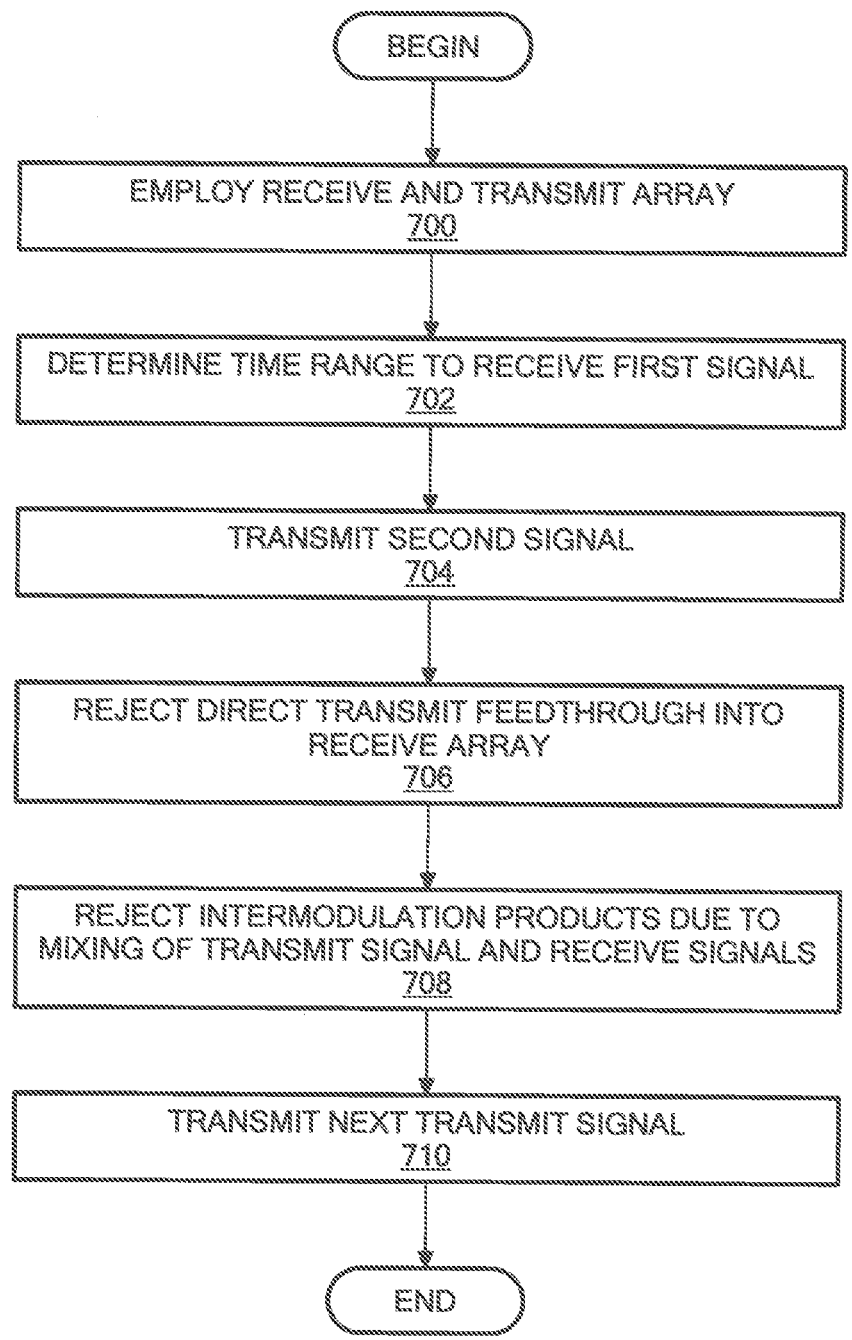
FIG. 17 is a flow diagram showing an exemplary sequence of steps for rejection intermodulation products.

FIG. 17 shows an exemplary sequence of steps for providing intermodulation product rejection in accordance with exemplary embodiments of the invention. In step 700, a receiver array and a separate transmitter array are employed to detect targets as selected altitudes. In one embodiment, the targets are LEO and MEO satellites. In step 702, a first signal at a first frequency is transmitted to detect a target within a first altitude range and a time range is determined from a first receive time to a second receive time for possible signal return from the target within the first altitude range. In step 704, a second signal is transmitted.

Step 706 includes rejecting direct transmit feedthrough into the receive array. Rejection of direct feedthrough can include changing transmit frequency and/or filtering. More particularly, the system can change the transmit frequency if the first signal return is expected during second signal transmission. A frequency gap can be provided between the first and second transmit signals. Filtering can include a bank of filters in the receivers to reject the transmit signal. Filtering can also include employing a notch filter tuned to the current transmit frequency.

Step 708 includes rejecting intermodulation products due to mixing of transmit signal and receive signals by randomizing super-element lengths and/or position, transmitting signals outside of a frequency range that contains current receive signal return, and/or providing frequency gaps between groups of receive signal returns within which false target intermodulation product will fall. In step 710, the next signal is transmitted in accordance with the above to reject direct transmit feedthrough and intermodulation products.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A method, comprising:
   transmitting a first signal at a first time at a first frequency to detect a target within a first altitude range;
   determining a time range from a first receive time to a second receive time for possible signal return from the target within the first altitude range; and
   receiving the possible signal return from the target in a frequency band of interest based upon the first frequency while transmitting a second signal at a second frequency spaced a selected frequency distance from the first frequency to place false target return outside the frequency band of interest for rejecting intermodulation products.

2. The method according to claim 1, further including transmitting the second signal to place transmit feedthrough outside of the receive frequency band of interest.

3. The method according to claim 1, further including transmitting the second signal within the receive frequency band of interest.

4. The method according to claim 1, wherein the first altitude range is from about 100 km to about 42,000 km.

5. The method according to claim 1, further including randomizing super-element position in an array to receive the signal return.

6. The method according to claim 1, further including randomizing super-element length in an array to receive the signal return.

7. The method according to claim 2, further including notch filtering the transmit feedthrough.

8. A radar system, comprising:
   a receive aperture and a separate transmit aperture; and
   an exciter to enable transmitting a first signal at a first time at a first frequency to detect a target within a first altitude range and determine a range from a first receive time to a second receive time for possible signal return from the target within the first altitude range,
   wherein the possible signal return from the target is received in a frequency band of interest based upon the first frequency while transmitting a second signal at a second frequency spaced a selected frequency distance from the first frequency to place false target return outside the frequency band of interest for rejecting intermodulation products.

9. The system according to claim 8, wherein the first altitude range is from about 100 km to about 42,000 km.

10. The system according to claim 8, wherein the receive aperture includes a series of super-elements having randomized positions.

11. The system according to claim 8, wherein the receive aperture includes a series of super-elements having randomized lengths.

12. The system according to claim 8, wherein the exciter includes a GPS-disciplined signal source.

13. The system according to claim 7, further including a notch filter to filter downconverted transmit feedthrough.

14. A method, comprising:
   transmitting a first signal at a first time at a first frequency to detect a target within a first altitude range;
   determining a time range from a first receive time to a second receive time for possible signal return from the target within the first altitude range; and
   receiving the possible signal return from the target in a frequency band of interest based upon the first frequency while transmitting a second signal at a second frequency spaced a selected frequency distance from the first frequency for rejecting intermodulation products.

* * * * *